United States Patent [19]

Kask

[11] 3,906,795
[45] Sept. 23, 1975

[54] GRAVITY CELL FOR LIQUID LEVEL MONITORING

[75] Inventor: Eugene Kask, Willimantic, Conn.

[73] Assignee: Rogers Corporation, Rogers, Conn.

[22] Filed: Mar. 20, 1974

[21] Appl. No.: 452,716

[52] U.S. Cl. ............... 73/309; 73/322.5; 116/110; 137/404; 340/244 D
[51] Int. Cl.² ........................................ G01F 23/06
[58] Field of Search ........... 73/309, 322.5; 116/110; 340/244 R, 244 A, 244 D; 137/404, 401

[56] References Cited
UNITED STATES PATENTS

| | | |
|---|---|---|
| 329,176 | 10/1885 | Kenyon .............................. 116/110 |
| 513,474 | 1/1894 | Bate .............................. 73/322.5 X |

Primary Examiner—Richard C. Queisser
Assistant Examiner—Joseph W. Roskos

[57] ABSTRACT

A gravity type cell for liquid level monitoring is presented wherein the sensor is cup shaped or has a hollow interior to receive the fluid whose level is to be monitored. The weight of the liquid contained in the cell provides an actuating force.

7 Claims, 4 Drawing Figures

GRAVITY CELL FOR LIQUID LEVEL MONITORING

BACKGROUND OF THE INVENTION

This invention relates to the field of liquid level monitoring devices. More particularly, this invention relates to the field of gravity type devices for monitoring liquid level, either for monitoring to determine when a specific level has been reached or for forms of continuous monitoring of liquid level.

Many liquid level monitoring devices have been used and proposed in the past. These devices are commonly used to measure the depth of liquid in a vessel or container. Such vessels or containers may include storage tanks for petroleum products, water, vegetable oils and coolant fluids, and the vessels may be either stationary or in a moving environment such as on an automobile, boat or airplane. Prior art liquid level monitoring devices have ranged from very simple to very sophisticated devices. However, the very simple devices have typically been plagued with problems of inaccuracy, and the very sophisticated devices have been plagued with problems of reliability and durability commonly experienced with complicated devices. The prior art devices have also encountered environmental or compatibility problems caused by such factors as the corrosiveness of the liquid being monitored or the operating pressure or temperature of the liquid or within the container for the liquid.

SUMMARY OF THE INVENTION

The above discussed problems of the prior art are minimized or overcome with the gravity type liquid level monitoring device of the present invention. The monitoring device of the present invention is a gravity cell having a shell or casing which is to be fully or partially immersed in the liquid to be monitored and which has openings to receive some of that liquid. The shell is selected to have a specific gravity equal to or greater than that of the liquid being monitored. The gravity cell monitoring device can be viewed as being of two different weights; one weight being the weight of the shell plus the enclosed liquid, when the device is not totally immersed in the fluid being monitored; and the other weight being the weight of the shell alone minus the weight of liquid displaced by the shell material itself, when the device is fully immersed in the liquid being monitored. The weight of the liquid contained in the shell provides the actuating force whenever the shell is not fully immersed, whether because it is caused to float at the top of the liquid or because the shell emerges from full submersion in the liquid as the level of the liquid drops. In either event the weight of the liquid contained in the shell provides the actuating force.

An essential feature of the monitoring device of the present invention is that the interior of the gravity cell must remain open and connected to the main body of the liquid being monitored. This continuous communication between the interior of the gravity cell and the liquid being monitored is achieved either by leaving the top of the shell fully open or else by providing a cover with perforations to permit the liquid communication. The perforated cover arrangement is employed in cases where motion of the liquid is a factor, such as in moving vehicles. This continuous communication between the interior of the shell and the liquid being monitored provides an automatic adjustment or compensation to assure continued accurate operation of the device under varying conditions of temperature, pressure and specific gravity of the fluid being monitored.

Accordingly, one object of the present invention is to provide a novel and improved liquid level monitoring device employing a gravity type cell.

Still another object of the present invention is to provide a novel and improved liquid level monitoring device employing a gravity type cell composed of a shell which has an interior chamber containing liquid and communicating with the liquid whose level is to be monitored.

Still another object of the present invention is to provide a novel and improved liquid level monitoring device employing a gravity type cell which may be operated either as a continuous monitoring device or as a sensor of a predetermined particular level of liquid.

Still another object of this invention is to provide a liquid level monitoring device capable of functioning within a broad range of extreme temperatures and pressures, including a vacuum, without losing its monitoring accuracy and without sustaining damage.

Still another object of the present invention is to provide a liquid level monitoring device that allows for the selection of material compatible with the liquid whose level is to be monitored, without affecting the functioning of the device.

Other objects and advantages will be apparent and understood to those skilled in the art from the following detailed description and drawings.

BRIEF DESCRIPTION OF THE DRAWING

Referring now to the drawings, wherein like elements are numbered alike in the several figures.

DESCRIPTION OF THE PREFERRED EMBODIMENTS

Figure 1:
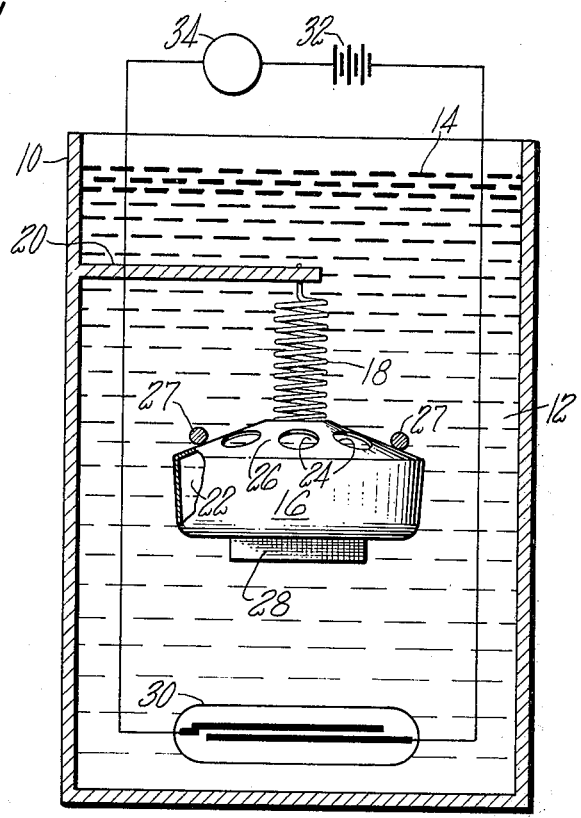
FIG. 1 is a schematic representation of one embodiment of the liquid level monitoring device of the present invention with the gravity type cell fully immersed in liquid.

Referring now to the drawings, the liquid level monitoring device of the present invention is shown in a configuration where a balancing force is employed. It will, however, be understood that the configuration shown in FIGS. 1 and 2 is merely one possible configuration and that other forms of balancing, such as counterbalancing configurations, may be employed; and configurations may also be employed where balancing is unnecessary.

Figure 2:
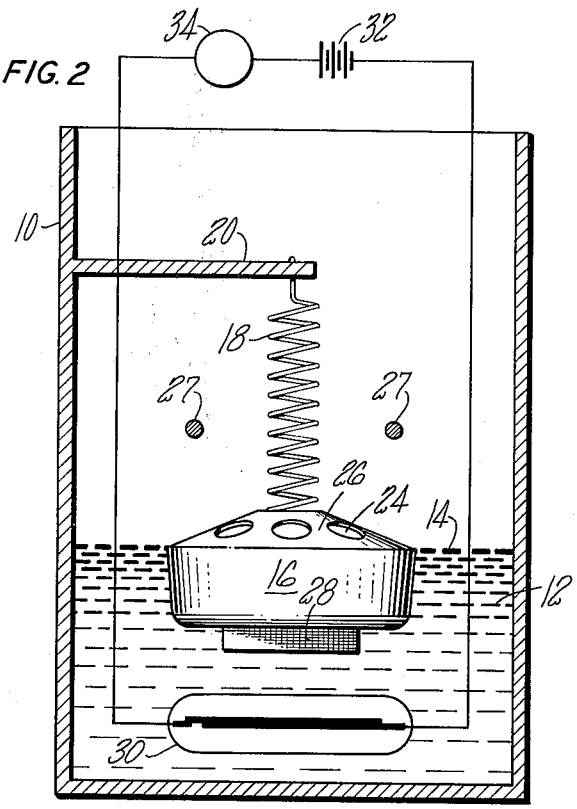
FIG. 2 is a view similar to FIG. 1 showing the gravity type cell after it has partially emerged from the fluid when the level of liquid has dropped.

Referring now to FIG. 1, a container or tank 10 contains a liquid 12. Container 10 may be any particular type or shape of a container, and liquid 12 may, similarly, be any general liquid whose level is to be monitored. In FIG. 1, container 10 is almost full with liquid 12, the upper surface 14 of liquid 12 being near the top of container 10. A gravity type cell in the form of shell 16 is suspended in container 10 in an equilibrium state, the suspension being accomplished by a spring 18 which is connected at one end to shell 16 and the other end of which is connected to a suspension arm 20. Shell 16 is composed of a material having a specific gravity the same as or slightly higher than the specific gravity of the liquid 12 whose level is to be monitored. The balancing or compensating force of spring 18 is directly related to the specific gravity of shell 16 in that the compensating force of the spring (or other balancing system) must be approximately equal to the weight resulting from the specific gravity of the shell exceeding the specific gravity of the liquid.

The construction of shell 16 is of critical importance in the present invention in that a portion of shell 16 must be filled with the liquid being monitored, and there must be liquid communication between that portion of shell 16 and the liquid 12. In the configuration shown in FIG. 1, shell 16 has a full or partially hollow interior 22, and liquid communication between interior 22 and liquid 12 is achieved by a plurality of openings 24 in a cap 26 forming part of shell 16. In essence, shell 16 is cup shaped with a full or partially hollow interior. Cap 26 may be omitted in configurations wherein motion of tank 10 is not involved, but in those arrangements where motion is involved, such as in an automobile gas tank, cap 26 prevents emptying of interior chamber 22 which might otherwise be caused by sudden motion of the vehicle. The particular shape of hollow interior chamber 22 is not of especial importance; the important fact is that it be of general cup shape or similar shape capable of holding a volume of the liquid 12.

If removed from tank 10 and suspended in the air, shell 16, with chamber 22 filled with the liquid 12, would weigh an amount equal to the weight of shell 16 plus the weight of the enclosed liquid. However, when suspended in liquid 12 and submerged, as shown in FIG. 1, it only "weighs" an amount equal to the weight of the shell minus the weight of the liquid displaced by the shell. Bearing in mind that the shell material is selected to have a specific gravity equal to or just slightly greater than that of liquid 12, the total immersed "weight" is thus a very low figure. Therefore, spring 18 only needs to be a very light spring capable of balancing this total immersed weight. Ideally, the force of spring 18 should, in the configuration shown in the drawings, provide a slight over compensation resulting in a slight upward force, which upward thrust may be taken up against a mechanical stop, such as fingers 27.

As the level of liquid 12 in tank 10 begins to drop, upper surface 14 eventually begins to uncover cap 26. The fluid inside shell 16 above the lower level of openings 24 will flow out into the main body of fluid 12. However, all of the fluid below openings 24 will remain in the interior of shell 16. As upper surface level 14 continues to drop and expose shell 16, the entire weight of the liquid contained in shell 16 becomes available to and provides an actuating force in a downward direction. The weight of this contained liquid (i.e. the liquid within shell 16) continues to remain available as liquid level height 14 continues to decrease, and shell 16 will thus travel downward to track the upper level 14 of the liquid, as shown in FIG. 2.

The relationship between the fully immersed, and hence stable condition of the gravity cell in FIG. 1 and the partially emerged or exposed condition of FIG. 2 can be expressed as follows:

Let $X$ = the weight of shell 16, $Y$ = the weight of the liquid in shell 16 in FIG. 1, $Y_1$ = the weight of liquid in shell 16 in FIG. 2, $Z$ = the weight of liquid displaced by shell 16 in FIG. 1 and $Z_1$ = the weight of liquid displaced by shell 16 in FIG. 2 ($Y \approx Y_1$ and $Z \approx Z_1$)

In the fully immersed and stable configuration of FIG. 1, the weight of shell 16 will be $(X+Y) - (Y+Z) = X - Z$. In the partially emerged or exposed configuration of FIG. 2, the weight of shell 16 will be $X+Y_1 - Z_1$. Thus, in the configuration of FIG. 2 essentially the full weight of the liquid contained in shell 16, i.e. $Y_1$, becomes available to act as a downward force to provide the actuating force for the sensor mechanism.

Referring now to a combined consideration of FIGS. 1 and 2, one example of an alarm mechanism is shown to provide a signal when liquid level 14 reaches a predetermined low level. The alarm mechanism includes a magnet 28 on the bottom of shell 16 and a reed switch 30 near the bottom of tank 10. In the FIG. 1 configuration the magnet is sufficiently removed from reed switch 30 so that it does not affect the reed switch, and the contact elements are open. When magnet 28 approaches reed switch 30 in FIG. 2, the magnet causes the contact elements to be brought together, thus closing a circuit which contains a battery or other power source 32 and a warning light 34 or other alarm device. The closing of the contacts of reed switch 30 completes the circuit whereby warning device 34 is actuated to signal that a predetermined low level of the liquid in tank 10 has been reached.

The operation of the device described with respect to FIGS. 1 and 2 could be reversed in that it could be employed to provide a high level indication rather than a low level indication. Shell 16 will move upward from the low position of FIG. 2 to the equilibrium position of FIG. 1 as tank 10 is filled up. Thus, a high level warning device can be arranged merely by placing reed switch 30 and magnet 28 in a position such that the magnet will influence the operation of the reed switch as shell 16 approaches the equilibrium position of FIG. 1.

As has been indicated above, perforated cap 26 is particularly useful when the sensor is being used in a movable environment, such as in the gas tank of an automobile or in the lubrication system of an automobile to indicate a low level of lubricating oil. The cap can be omitted when the sensor is employed in stationary storage tank installations. The essential feature of shell 16 remains, in all configurations, that the interior of shell 16 be cup shaped or hollowed or otherwise appropriately shaped so it can receive and retain the fluid in the tank. This communication with and presence of part of the main body fluid within shell 16 not only provides the actuating force for the device, but it also renders the device self-adjusting under varying conditions. For example, if the temperature or specific gravity of the main body of liquid 12 changes or if there is a change in pressure level within tank 10, or if external environmental factors change, the fluid in the interior of shell 16 will undergo a comparable change to that experienced by liquid 12, and thus there is an automatic adjustment of the sensor element for any such changes. Because of this automatic adjustment feature, changes in calibration on outside reading scales which may be connected to the sensing mechanism are unnecessary.

As has also been indicated above, shell 16 should, ideally, have the same specific gravity as the liquid in the tank in which it is to be employed. In this way the average specific gravity of the filled sensor, i.e. sensor filled with fluid, can be brought close to that of the liquid in tank 12. If the specific gravity of the material of shell 16 is matched to that of liquid 12, then a balancing force, such as spring 18, can be omitted, and the full range of the weight change of the liquid filled shell as it emerges from the fluid will be available for force actuation. However, if a system is designed to eliminate the balancing force by providing a match-up between the specific gravity of the shell with the specific gravity of the liquid, that system will function properly only as long as the specific gravity of the liquid remains unchanged. Thus, from a practical standpoint a spring or counterbalance or other balancing device will be used, and the gravity cell may be slightly overbalanced in one direction.

It should also be noted that there is great flexibility in selecting the material to be employed for shell 16. A designer can select materials which are entirely compatible with the liquid 12. Thus, a thin gauge metal can be used to form shell 16 when desired, or material such as glass or porcelain can be used when problems of chemical corrosion may otherwise be present.

FIGS. 1 and 2 have been described above in the context of a low level or high level indicator. That is, they have been described as operating to indicate the occurrence of a low level of fluid or a high level of fluid in the tank. In addition, by the proper selection of the balancing force imposed by spring 18, the gravity type cell can be caused to float in or near the surface of the liquid. This characteristic can be used for a continuous monitoring of the level of the liquid since the sensor will follow all changes in close analogy to a float configuration. The basic requirement for achieving this result is that the compensating force of spring 18 (or any other suitable suspension system) must remain essentially constant over the extent of travel of shell 16. Any suitable indicating system can be employed to read out the continuous level of fluid. For example, a series of reed switches can be positioned at various heights in the interior of tank 10 and a magnet positioned on shell 16 to successively pass in close proximity to each of the reed switches. The switches would then be sequentially activated to indicate the level of liquid in the tank. Other balancing systems can be used instead of the spring in FIG. 1.

Figure 3:
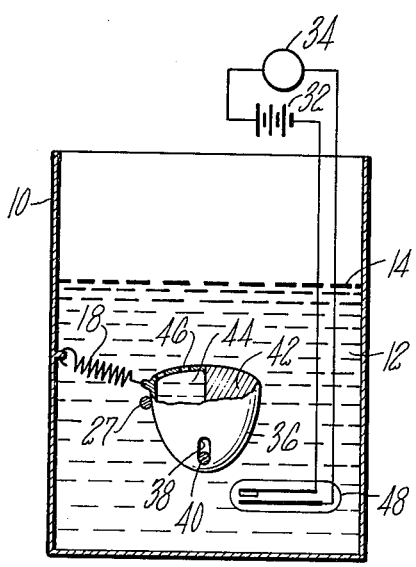
FIG. 3 is a view similar to FIG. 1 showing a modified form of the gravity cell fully immersed in liquid.
Figure 4:
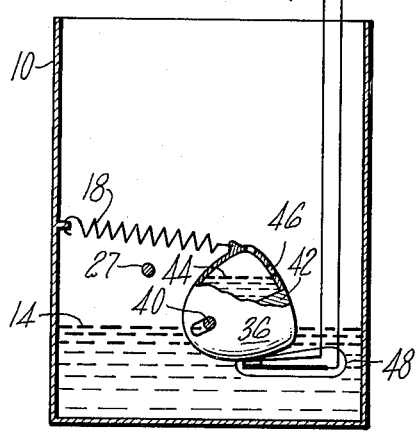
FIG. 4 is a view similar to FIG. 2 showing the cell of FIG. 3 partially emerged from the liquid.

Referring now to FIGS. 3 and 4, a second possible embodiment of the present invention is shown employing a counterbalancing system. The graviy cell of the embodiment of FIGS. 3 and 4 includes a shell 36 which has a vertically extending elongated mounting opening 38. Shell 36 is mounted for travel on a locating pin 40. The gravity cell is divided into two parts; the right hand side is composed of a ballast material 42 which has a specific gravity the same as or slightly greater than that of the liquid 12. Ballast material 42 may be a solid of the same material as shell 36 or a different material, or it may be a suitable liquid in a sealed compartment when temperature and pressure conditions permit. The other part of shell 36 is a hollow chamber corresponding to the hollow interior 22 of FIG. 1. A plurality of openings 46 lead into hollow chamber 44 to provide direct and continuous communication between the interior of chamber 44 and the liquid 12. The weight of the ballast material 42 must be equal to the weight of the hollow half of the shell 36 when filled with liquid 12 in air; i.e. not supported in liquid 12.

In the situation shown in FIG. 3, shell 36 is completely immersed in liquid 12 and is in a stable submerged position.

Referring now to FIG. 4, a condition is shown wherein the upper level 14 of the liquid has fallen to a level where shell 36 has emerged from the fluid. As level 14 drops the weight of the liquid in chamber 44 moves the gravity cell downward until pin 40 engages the top of slot 38. Upon further reduction in the height of surface 14, the weight of material 42 then causes the gravity cell to rotate clockwise to close the normally open contacts of an electrical switch 48 and thus activate alarm signal 34.

When the level of the liquid again rises in tank 10 so that shell 36 is fully submerged, it will rotate to an upright position and move upward on locating pin 40 until it assumes a stable position with the pin 40 at the bottom of slot 38. In this embodiment, a compensating force (such as spring 18 as discussed in FIG. 1 and shown schematically in FIGS. 3 and 4), is required to effect the desired movements of the device. Although a symmetrical construction of the shell 36 is shown with slot 38 centered, variations from this shape will help the designer to achieve beneficial effects tailored to the problem at hand. Similarly, the slot, shown vertical in FIG. 3, can be offset from the center line or at a suitable angle to satisfy special conditions in achieving a positive action.

The embodiment in FIG. 3 is especially useful under conditions where a positive signal over a short range of liquid level change is required.

It will be understood that the two embodiments discussed above are merely exemplary of the configurations into which the gravity cell of the present invention can be formed. For example, the gravity cell could be in the form of an unsuspended element resting freely on a pressure sensitive diaphragm. Changes in apparent weight of the gravity cell could be transduced through the diaphragm to effect a change in hydraulic or pneumatic pressure on the other side of the diaphragm to thereby actuate external indicators or controls.

The gravity cell of the present invention has great flexibility in design, thereby availing itself for use in a great variety of installations. It may be used both as an indicator of liquid levels or as a control device actuated in response to liquid levels. The gravity cell of the present invention may be used to generate signals in a variety of ways. Signals may be generated directly, as by actuating a mercury switch, reed switch or other type of switch. If the shell of the gravity cell is made from a magnetic material, it can be used to directly change a constant magnetic field and thus actuate magnetically sensitive switches It is also possible to use a magnetic field to hold the gravity cell in equilibrium and then sense changes in this field caused by downward movement of the gravity cell to actuate switches. Furthermore, the configuration discussed above, of transducing through a diaphragm, may be used in installations where electrical circuits can not be used in the immediate area of the storage vessel because of danger of explosion.

As will be understood from the foregoing description, the freedom of choice of materials realized by the gravity cell of the present invention results in a device which can be safely used in environments where contamination presents a danger, such as food processing plants, chemical or drug dispensing units, and various types of medical and scientific apparatus. This freedom of choice of materials also makes the device readily applicable to automotive applications where high temperature and chemically corrosive environments are encountered, such as by use for fluid level indicators for hydraulic brake fluid, engine oil, engine coolant, transmission fluid and gasoline.

The device is also particularly suitable for warning systems where an indicator has to remain capable of being operated for long periods of time without regular inspection and without regular actuation until exceptional conditions call for a signal, such as oil, brake fluid or transmission fluid indicators in automobiles or other engines.

The continuous communication between the surrounding liquid 12 and the interior of the shell 16, 36 is the prominent feature of this invention. It allows for self-adjustment of the device to changing conditions by responding, for example, to volumetric and specific gravity changes of the liquid caused by fluctuating temperatures. This assures inherent adjustment and constancy in accuracy of readings of liquid level. Pressurization effects in a vessel under high pressure or vacuum are equally important. A shell with the openings of this invention becomes a part of a balanced hydrostatic pressure system inside the liquid, with balanced pressures acting on all points of the inside and outside of the shell. Such a shell will not burst or be crushed or otherwise be affected by tank pressures, and constancy of accuracy in readings of liquid level is realized.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A liquid level monitoring device for determining a liquid level state in a container, the device including:
   a shell for insertion in the liquid whose level is to be monitored;
   a hollow interior chamber in said shell, said hollow interior chamber being in fluid communication with the liquid in the container whereby said hollow interior chamber contains some of said liquid at all times during liquid level monitoring, which contained liquid provides an actuating force for the liquid level monitoring device;
   an end cap on said shell, said end cap having opening means to provide said fluid communication between said interior chamber and the liquid whose level is to be monitored;
   means for determining at least one position of said shell in the container; and
   means for balancing said shell, said balancing means being the sole suspension for said shell and imposing a force opposite to the actuating force of said contained liquid.

2. A liquid level monitoring device as in claim 1 wherein:
   the specific gravity of said shell is equal to or slightly greater than the specific gravity of the liquid whose level is to be monitored.

3. A liquid level monitoring device as in claim 2 wherein:
   said balancing means imposes a force to balance the force resulting from the specific gravity of said shell exceeding the specific gravity of the liquid to be monitored.

4. A liquid level monitoring device for determining the liquid level state in a container, the device including:
   a shell for insertion in the liquid whose level is to be monitored;
   a hollow interior chamber in a first part of said shell, said hollow interior chamber being in fluid communication with the liquid in said container when the level of the liquid is above a predetermined value whereby said hollow chamber contains some of said liquid at all times;
   an end cap on said hollow interior chamber, said end cap having opening means to provide said fluid communication between said interior chamber and the liquid whose level is to be monitored;
   ballast means in a second part of said shell to provide an actuating force for the liquid level monitoring device;
   means mounting said shell for pivotal movement induced by said ballast means at a predetermined level of the liquid whose level is to be monitored; and
   balancing means for balancing said shell, said balancing means imposing a force opposite to the actuating force of said ballast.

5. A liquid level monitoring device as in claim 4 wherein said means mounting said shell for pivotal movement includes:
   elongated slot means in said shell and pin means engaging said slot.

6. A liquid level monitoring device as in claim 4 wherein:
   the specific gravity of said shell is equal to or slightly greater than the specific gravity of the liquid whose level is to be monitored.

7. A liquid level monitoring device as in claim 4 wherein:
   the weight of said ballast means is at least equal to the weight of said first part of said shell filled with the liquid whose level is to be monitored.

* * * * *